Sept. 3, 1968            D. SATAS            3,399,671
SPRAY COATED ABSORBENT DRESSING
Filed Feb. 1, 1966
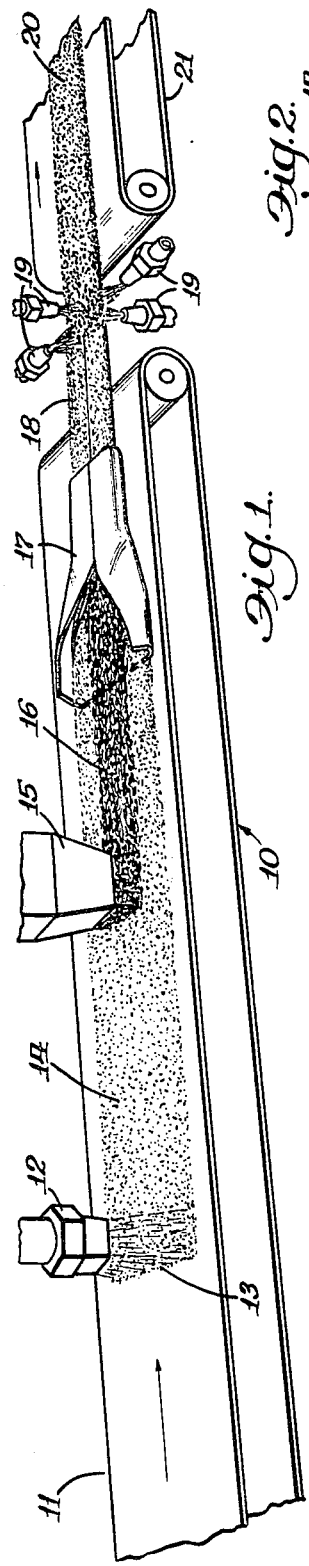
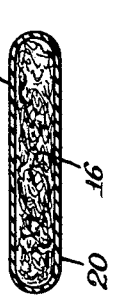
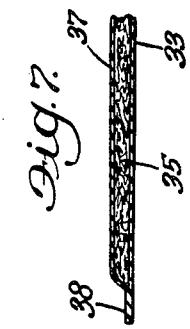
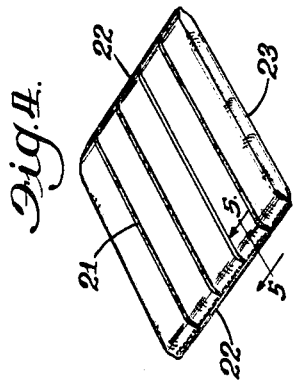
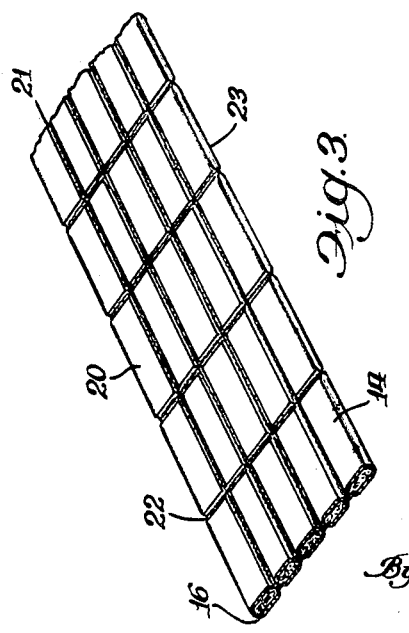
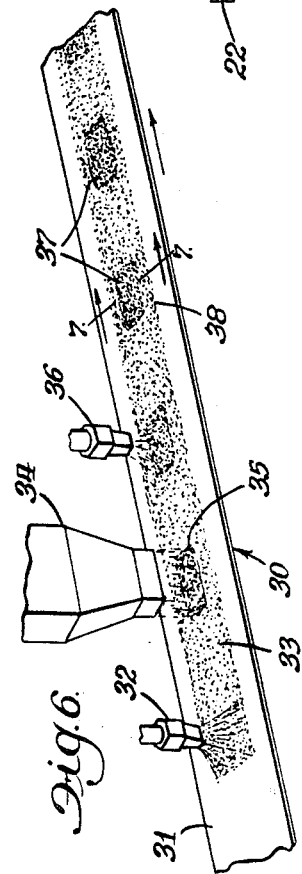
Inventor
Donatas Satas
By James P. Fawcett
Atty.

United States Patent Office 3,399,671
Patented Sept. 3, 1968

3,399,671
SPRAY COATED ABSORBENT DRESSING
Donatas Satas, Palatine, Ill., assignor to The Kendall Company, Boston, Mass., a corporation of Massachusetts
Continuation-in-part of application Ser. No. 31,182, May 23, 1960, now Patent No. 3,232,819, dated Feb. 1, 1966. This application Feb. 1, 1966, Ser. No. 524,304
15 Claims. (Cl. 128—156)

This invention is concerned with absorbent dressings of the type in which a nonintegrated fibrous absorbent base is spray coated with a fluid-permeable substantially nonabsorbent coating which coating forms at least one of the major faces of an envelope retaining the absorbent base. More particularly, the spray coating of the invention is a solvent solution of a normally solid polymer so sprayed as to produce a soft, flexible, permeable coalesced accretion of interfitted and impact distorted small threadlike particles and nodules.

The coatings of the dressings of this invention are those applied by the methods disclosed in my copending application Ser. No. 31,182, filed May 23, 1960, issued Feb. 1, 1966 as U.S. Patent No. 3,232,819, and of which this application is a continuation-in-part.

Certain normally solid resins when applied by the methods set forth in my above mentioned patent present a hard surface which in most cases is undesirable for body contacting dressing surfaces. For that reason it is advantageous with such resins to use nontoxic plasticizers to the extent that the dried sprayed coating is soft but still lacking in cold flow. Suitable nontoxic plasticizers are known for all of the respective normally solid polymers. In addition many suitable polymers for the sprayed layer of this invention are hydrophobic in nature and are not wetted by body fluids. This can be overcome by the addition of a small amount of a wetting agent to the polymeric solution.

For purposes of this invention, the term "normally solid polymer" is a polymer which, after it reaches the gel stage and until and while it is completely dried from solution, will not flow sufficiently to close pores therein either at ambient temperatures or at the lowest practical temperatures for solvent drying.

For purposes of this invention a "solution of a normally solid polymer" is a solution of which when sprayed under the conditions hereinafter set forth forms a gel which is still in tacky condition when it strikes the surface being sprayed.

The most suitable fibers for fibrous absorbent bases of the dressings of this invention are natural fibers such as wood pulp or cotton treated to make it absorbent. However, other hydrophylic synthetic fibers such as rayon fibers are entirely suitable as are those hydrophobic fibers which may be rendered wettable by wetting agents or other treatment. The word absorbent as used in this invention, therefore, is intended to include fibrous structures which will retain moisture either due to capillarity or to absorption by the fiber itself or both.

Spray coating of absorbent base materials to produce absorbent dressings has been suggested before. In U.S. Patent No. 2,339,562, it was proposed spraying textile fibers with ethyl cellulose, cellulose acetate and other cellulose derivatives or with either vulcanized or unvulcanized rubber latex, Bakelite, urea formaldehyde resins and other condensation formaldehyde resins. The conditions of spraying are not clearly defined in the patent but apparently the coating produced with a gauze-like or net-like surface structure of an open mesh foraminous character with the absorbent base visible through the mesh. The invention of the cited prior art patent applied only to textile fiber absorbent bases, presumably because the open mesh would not retain short less-expensive fibers such as wood pulp.

The products of this invention have coatings with irregular serpentine channels through which fluid may penetrate but the channels are of such nature and size as to preclude loss of absorbent fibers. Where the coatings of this invention are not transparent the fibers of the absorbent base are not visible.

It is an object of this invention to provide a soft flexible integral dressing in which at least the major side intended for body contact is a soft sprayed unified sheet permeable to body fluids and the other major side is also an integrated sheet, the two sheets retaining the fibers of an absorbent unintegrated fibrous body between them.

It is a further object of the invention to provide a soft flexible integral dressing in which rounded edges are provided by a soft sprayed unified sheet permeable to body fluids which extends on both major surfaces of the dressing to form a channel in which is retained the fibers of an absorbent unintegrated fibrous body.

It is a still further object of the invention to provide a dressing in which a soft flexible porous but otherwise smooth sprayed film constitutes a major fluid permeable side intended for body contact and the other major side is a unified sheet, the two sheets retaining the fibers of an absorbent unintegrated fibrous body between them.

It is another object of this invention to provide a unique method of making dressings by a continuous process whereby the fibers of an unintegrated fibrous absorbent body are retained between major surfaces of two integrated sheets at least one of which is a soft sprayed porous sheet intended for body contact.

It is a further object of this invention to provide a unique continuous method for forming a dressing wherein a soft sprayed porous channel retains the fibers of an uintegrated fibrous absorbent body.

Other objects of the invention will be apparent from a study of the drawings and specification.

In the drawings:
FIGURE 1 illustrates in perspective a typical continuous production method for producing the dressings of this invention.
FIGURE 2 illustrates in cross section a dressing of the invention produced on the apparatus of FIGURE 1.
FIGURE 3 illustrates in perspective an elongated dressing of the type shown in FIGURE 1 further treated to compress and seal the dressing in a typical grid pattern.
FIGURE 4 is a perspective view of a typical dressing of the invention cut transversely along the seal areas from the elongated dressing of FIGURE 3.
FIGURE 5 is a partial cross section of the dressing of FIGURE 4 showing the pressed and sealed edge.
FIGURE 6 is a perspective view of another apparatus for making dressings of the invention.

FIGURE 7 is a cross section of a typical dressing made by the apparatus of FIGURE 6.

In my original patent above mentioned, it is taught that coatings of the type of this invention may be reinforced with strengthening fibers or with knitted, woven or nonwoven fabrics, mats, nets and the like. The products of this invention are not concerned primarily with strong coatings nor with the reinforcing characteristics of the materials upon which the coatings are sprayed. Rather the coating materials are selected so that the sprayed coating is desirably soft and itself free of loose fibers whereby it acts as a barrier retaining the fibers of the absorbent material away from the surface of application. Above all, the coating must permit ready penetration of liquids such as body liquids into the absorbent material.

The spray coating is applied to the body of fibers in this invention as in my above mentioned patent, the spray orifice being located from 10 to 30 inches from the body of fibers, optimum distance being from 18 to 22 inches. Likewise, the velocity of the air stream which atomizes the coating solution must be at least 400 feet per second and the polymer solution to air ratio in the range of .18 to .55 by weight.

Referring once more to the drawings:

In FIGURE 1, the apparatus 10 consists of two endless release surfaced belts, 11 and 21, a bank of spraying nozzles 12 producing a spray 13 of normally solid polymer in solution. The distance from the spraying nozzles to the belt is in the range of 10–30 inches, preferably about 18 inches. The polymer strikes the belt in the gelled condition while it is still tacky. It conforms itself by accretion to the belt surface, the accretion comprising randomly arranged overlapping and interfitting solid filamentous strands having lengths predominately in the range of 200 to 2500 microns and diameters predominately 10 microns and less and irregularly shaped nodular particles, both strands and particles being modified by impact with the belt. If the latter is smooth, such as a stainless steel belt coated with silicone resin, the accretion surface next to the belt will be smooth with small pores leading to serpentine channels which make the accretion air and fluid permeable. This surface makes an excellent body contact surface. The back side of the accretion 14 is very soft with a feel and flexibility resembling chamois. The back side also makes an excellent body contact surface. A very similar surface may be imparted to the belt side of the accretion by proper selection of the belt surface. For instance, the belt surface may be formed by spraying using the nozzle bank 12 and spraying a solution of normally solid resin which in itself has release properties. Or a light coating of a silicone resin may be sprayed on an underlying accretion deposited to form the belt surface. Probably, the easiest method and the one preferred is to spray over the belt side of the accretion with additional sprayed material as is illustrated in FIGURE 1. Alternatively, one may turn over the normal accretion sprayed on a smooth belt so that the smooth surface is inside and the chamois-like side is outside where that is preferred. Obviously, any sheet may be substituted for the accretion 14 where the sheet is to form the back side rather than the wound contacting side of the dressing. Obviously, also, where the substituted sheet is nonporous such as an imperforate film, it should not fold over to the center as is illustrated but fold over only slightly at the edges. Preferably, where any sheet is substituted, it should adhere to the spray deposited by the nozzles 19 but since these nozzles form a continuous sheath such adherence is not essential. Where the spray does adhere to the substituted sheet, however, the nozzles 19 may be arranged to avoid spraying on the belt side of the substituted sheet.

Regardless of whether the sheet first laid down is a spray deposited accretion such as 14 or a substituted sheet, as it moves down on the belt 11 the hopper 15 continuously deposits a band 16 of unintegrated fibers centrally of the sheet. The sheet then goes through the folder 17 and comes out as an almost fully closed channel 18 containing the band of fibers 16 or a more open channel containing the fibers. The spray nozzles 19 then coat a sheath of the spray accretion or in some instances, as has been indicated, a top covering only. The dressing 20 is then complete except for end sealing and cutting into proper lengths in the end seal zones.

FIGURE 2 illustrates in cross section the dressing 20 as it comes from the belt 21. The band of unintegrated fibers 16 is retained between the belt contacting accretion 14 and the folded over and additionally sprayed portions of accretion 14. Where the sheet first laid down is an accretion sprayed onto a smooth belt and the bottom of the dressing is not further sprayed, one major side of this dressing is a porous film while the other side is like chamois. Alternatively, if the accretion is turned over before depositing the band of unintegrated fibers or the bottom of the dressing is further sprayed, the entire covering has the feel of chamois.

FIGURE 3 illustrates in perspective and partly in cross section a finished length of dressings after being processed through aligned coacting heat sealing grids. The dressing is compressed and heat sealed along longitudinal spaced bands 21. Likewise, the dressing is compressed and heat sealed along transverse spaced bands 22. The rounded edges 23 are those produced by the method illustrated in FIGURE 1.

FIGURE 4 illustrates in perspective a dressing of several units formed by cutting the dressings of FIGURE 3 along two adjacent transverse sealing lines 22.

FIGURE 5 illustrates in cross section how the seal 22 appears with the fibers retained in the sealed area in compressed state.

FIGURE 6 illustrates an alternative method of making dressings with circumscribing fin edges. An accretion 33 is sprayed onto the belt 31 of the apparatus 30 by the spray head 32. The hopper 34 is intermittent in its action depositing a patch of unintegrated fibers 35 at spaced intervals. Thereafter, the spray head 36 deposits a covering 37 over the patches unifying the covering with the original accretion at points beyond the patches. In actual practice, the patches are much closer together and come closer to the edge to reduce waste. Thereafter, the individual dressings are trimmed from the dressing band. FIGURE 7 illustrates an edge portion of this type of dressing showing how the top and bottom accretions merge where they contact during the manufacturing process.

The accretion 33 may, as before, be replaced with some other sheet or it may be turned over before the fiber patches are deposited, thus creating dressings with both surfaces similar to chamois as opposed to a dressing with one smooth filmlike side except for pores as is illustrated.

EXAMPLE I

Using the apparatus illustrated in FIGURE 1, a sprayed accretion was deposited on the stainless steel belt by the bank of spray nozzles 12. Approximately 1 mil of normally solid plasticized resin was deposited from the following solution under conditions as indicated:

| | |
|---|---:|
| Geon Polyblend 503H _____parts by wt__ | 100 |
| Acetone (low boiling solvent) _____do____ | 310 |
| Cyclohexanone (high boiling solvent) _____do____ | 100 |
| Dimethyl sebacate _____do____ | 20 |
| Igepal CO630 (wetting agent) _____do____ | 2 |
| Spraying conditions: | |
| Distance, forming surface to nozzle __inches__ | 18 |
| Pressure (air) _____p.s.i.g__ | 55 |
| Polymer solution pumping rate _____lbs./hr__ | 4 |
| Orifice cross-sectional area (for air passage only) _____sq. in__ | 0.005 |

Wood pulp was deposited in a continuous stream about ¼ inch in thickness upon the center half of the moving sprayed accretion. The marginal portions of the accretion were folded over the wood pulp substantially covering it by the folder 17. The nozzles 19 then applied additional sprayed accretion to only the top portion of the continuous moving dressing. Transverse heat seals were then applied to the dressing while individual dressings were severed simultaneously in the heat sealed area. The dressings resembled FIGURE 2 in cross section with the sealed ends resembling FIGURE 5. The dressing produced had a soft smooth filmlike belt-side surface interrupted by small irregular pores. The opposite side had a soft chamois appearance and feel. Both sides were suitable as wound contact surfaces and transferred wound exudate well when applied to wounds of laboratory animals.

EXAMPLE II

The same materials and the same conditions as are indicated in Example I were used except that the nozzles 19 sprayed additional accretion on the belt side as well as the back side of the continuous dressing. As a result, both sides had a similar soft chamois appearance and feel. Both sides were suitable as wound contact surfaces transferring exudates well.

EXAMPLE III

A two mil vinyl film approximately 20 inches wide was substituted for the first laid accretion of Example I. A continuous layer of wood pulp was applied extending in ¼ inch thickness to within about 1½ inches of the film edges. The folder 17 turned over the edge of the film causing it to assume rounded edges and to cover about 1¼ inches of the wood pulp layer at the sides. The sprayers 19 sprayed accretion on the top and rounded side edges but not on the dressing bottom using the spray solution of Example I. The continuous dressing was heat sealed transversely in about a 2 inch band and cut in the sealed area into individual dressings. Excellent disposable diapers and incontinent pads resulted with good body fluid uptake.

EXAMPLES IV AND V

Examples I and II were repeated except the formula and conditions below were substituted:

| | | |
|---|---|---|
| Estane 5740X1 | parts by wt | 100 |
| Tetrahydrofuran | do | 440 |
| Acetone | do | 200 |
| Titanox | do | 1.5 |
| Red iron oxide | do | 0.075 |
| Yellow iron oxide | do | 0.1 |
| Carbon black | do | 0.05 |
| Span 20 (wetting agent) | do | 2 |
| Spraying conditions: | | |
| Distance, target to nozzle | inches | 20 |
| Pressure (air) | p.s.i.g | 50 |
| Polymer pumping rate | lbs./hr | 5 |
| Orifice cross-sectional area (for air) | sq. in | 0.005 |

The dressings were entirely suitable as surgical dressings with either side in contact with animal wounds. The absorption and take-up of body fluids was excellent.

EXAMPLES VI, VII, AND VIII

Examples I, II and III were repeated with equally satisfactory results using the following formula and conditions:

| | | |
|---|---|---|
| Geon Resin 427 | parts by wt | 100 |
| Methyl ethyl ketone | do | 350 |
| Acetone | do | 200 |
| Polyethylene glycol di-2-ethyl hexoate | do | 25 |
| Pluronic L61 (wetting agent) | do | 3 |
| Spraying conditions: | | |
| Distance, target to nozzle | inches | 22 |
| Air pressure | p.s.i.g | 60 |
| Polymer pumping rate | lbs./hr | 3 |
| Orifice cross-sectional area (for air passage only) | sq. in | 0.01 |

EXAMPLE IX

Using the apparatus illustrated in FIGURE 6, the following solution was sprayed on a stainless steel belt under the conditions indicated using nozzle bank 32:

| | | |
|---|---|---|
| Cellulose acetate butyrate | parts by wt | 100 |
| Methyl ethyl ketone | do | 200 |
| Acetone | do | 200 |
| Santicizer E–15 (plasticizer) | do | 90 |
| Igepal CO–630 (wetting agent) | do | 2 |
| Spraying conditions: | | |
| Distance | inches | 18 |
| Pressure (air) | p.s.i.g | 60 |
| Pumping rate (polymer) | lbs./hr | 4 |
| Orifice cross-sectional area (for air) | sq. in | 0.005 |

A series of random patches of cut rayon fibers about ¼ inch thick was deposited at spaced intervals on the sprayed accretion extending almost to the edge at each side and with the leading edge of one patch about 1 inch behind the trailing edge of the immediately preceding patch. A further accretion was then sprayed onto the belt coextensive with the first accretion and covering the rayon fibers. A connected series of dressings requiring no heat sealing was formed and these when cut between the patches made excellent dressings with one soft smooth film side containing irregular small pores and one side of soft chamoislike appearance and feel. Its absorbency was excellent when tested.

EXAMPLE X

The conditions of Example IX were repeated but the first deposited accretion layer was turned over to make the smooth side the inside leaving the outside chamoislike. The patches were of short cotton fibers treated to make them absorbent. The second layer of accretion was then applied as in Example IX. After cutting between patches, the individual dressings were found to be very absorbent.

EXAMPLES XI AND XII

Examples IX and X were repeated but using the formula and conditions below:

| | | |
|---|---|---|
| Hypalon 30 | parts by wt | 100 |
| Methyl ethyl ketone | do | 400 |
| Acetone | do | 200 |
| MgO (pigment) | do | 20 |
| Igepal CO530 (wetting agent) | do | 2 |
| Spraying conditions: | | |
| Distance target to nozzle | inches | 18 |
| Pressure (air) | p.s.i.g | 55 |
| Polymer pumping rate | lbs./hr | 4 |
| Orifice cross-sectional area (for air passage only) | sq. in | 0.005 |

The dressings formed both with similar sides and with one smooth and porous and one chamoislike were quite absorbent of body fluids.

While in most instances it is unnecessary to dry the sprayed dressings of this invention other than by air drying, in some cases it may be desirable to run the material through a short drying oven to speed up production.

The materials indicated in the foregoing examples are identified as follows:

Igepal CO630 and CO530 are polyoxyethylated nonyl phenols, surfactants manufactured by Antara Chemicals, a Division of General Aniline and Film Corporation, 435 Hudson Street, New York 14, N.Y.

Span 20 is sorbitan monolaurate, a nonionic emulsifier manufactured by Atlas Powder Company.

Geon Resin 427 is a vinyl copolymer manufactured by B. F. Goodrich Chemical Company, 3135 Euclid Avenue, Cleveland 15, Ohio.

Pluronic L61 is a condensate of ethylene oxide with a hydrophilic base formed by condensing propylene oxide with propylene glycol, a surfactant manufactured by Wyandotte Chemical Corporation.

Santicizer E–15 is a plasticizer manufactured by Monsanto Chemical Company, Organic Chemicals Division, St. Louis 66, Mo.

Hypalon 30 is a chlorosulfonated derivative of polyethylene manufactured by E. I. du Pont de Nemours and Company Inc., Wilmington 98, Del.

I claim:

1. An integral absorbent body comprising a non-integrated layer of fibers retained between two sheet-like integrated layers at least one of said sheet-like layers comprising an accretion of randomly arranged overlapping and interfitting solid filamentous strands having lengths predominately in the range of 200 to 2500 microns and diameters predominately 10 microns and less, and irregularly shaped nodular particles, both strands and particles comprising normally solid polymer being coalesced into a unified air-permeable and moisture permeable structure.

2. The absorbent article of claim 1 wherein the fibers are wood pulp fibers which are completely enclosed between the integrated sheet-like layers.

3. The absorbent article of claim 1 wherein the other of said sheets is a substantially nonporous film.

4. The absorbent article of claim 1 wherein the other of said sheets is a porous but otherwise smooth surfaced film.

5. The absorbent article of claim 1 which is suitable as a surgical dressing and which is sterile.

6. The absorbent article of claim 1 wherein the two sheet-like integrated layers are similar.

7. The absorbent article of claim 6 wherein the two sheet-like layers merge to form rounded edges at the sides of said absorbent body.

8. The absorbent article of claim 1 wherein the sheet-like integrated layers extend in an area beyond the layer of fibers on at least two sides and are sealed together in this area.

9. The absorbent article of claim 1 wherein the sheet-like integrated layers and the layer of fibers are substantially coextensive at one or more sealed edges.

10. The absorbent body of claim 1 wherein the major surfaces present a puffed grid-like pattern, the lines of which represent areas in which the two sheet-like integrated layers are sealed together.

11. The method of forming a surgical dressing comprising continuously laying down a carrier layer, depositing a mass of fibers upon the carrier layer and spraying from a solution of a normally solid polymer a gelled deposit thereon to form a soft flexible liquid permeable covering layer comprising a dried accretion of randomly arranged overlapping and interfitting solid filamentous strands and irregularly shaped nodular particles, the carrier layer and the covering layer retaining the mass of fibers between them.

12. The method of claim 11 wherein the carrier layer is laid down under the same conditions as the covering layer, the two layers merging beyond the mass of fibers.

13. The method of claim 11 wherein the carrier layer is laid down under the same conditions as the covering layer being folded over the mass of fibers to form at least a partial cover at the side edges, said covering layer when applied merging with the folded over portions of the carrier layer to form a dressing with rounded side edges.

14. The method of claim 11 wherein the mass of fibers is deposited continuously extending longitudinally of said carrier layer and wherein after spraying said covering layer, said covering layer and said carrying layer are sealed together in a grid pattern to form an integral structure including a plurality of unit compartments containing portions of said fibers which structure may be separated into units of one or more compartments by cutting along the sealing bands forming the grid pattern.

15. The method of claim 13 wherein the carrier layer is deposited upon a smooth surface whereby a porous but otherwise smooth surface is imparted to one major side of the dressing.

References Cited

UNITED STATES PATENTS

| | | | |
|---|---|---|---|
| 2,339,562 | 1/1944 | Eustis | 128—156 |
| 2,621,139 | 12/1952 | Messing. | |
| 2,729,267 | 1/1956 | Walton. | |
| 3,292,619 | 12/1966 | Egler | 128—156 |
| 3,327,708 | 6/1967 | Sokolowski | 128—156 |
| 3,232,819 | 1/1966 | Satas | 161—72 |

ADELE M. EAGER, *Primary Examiner.*